Figure 1:
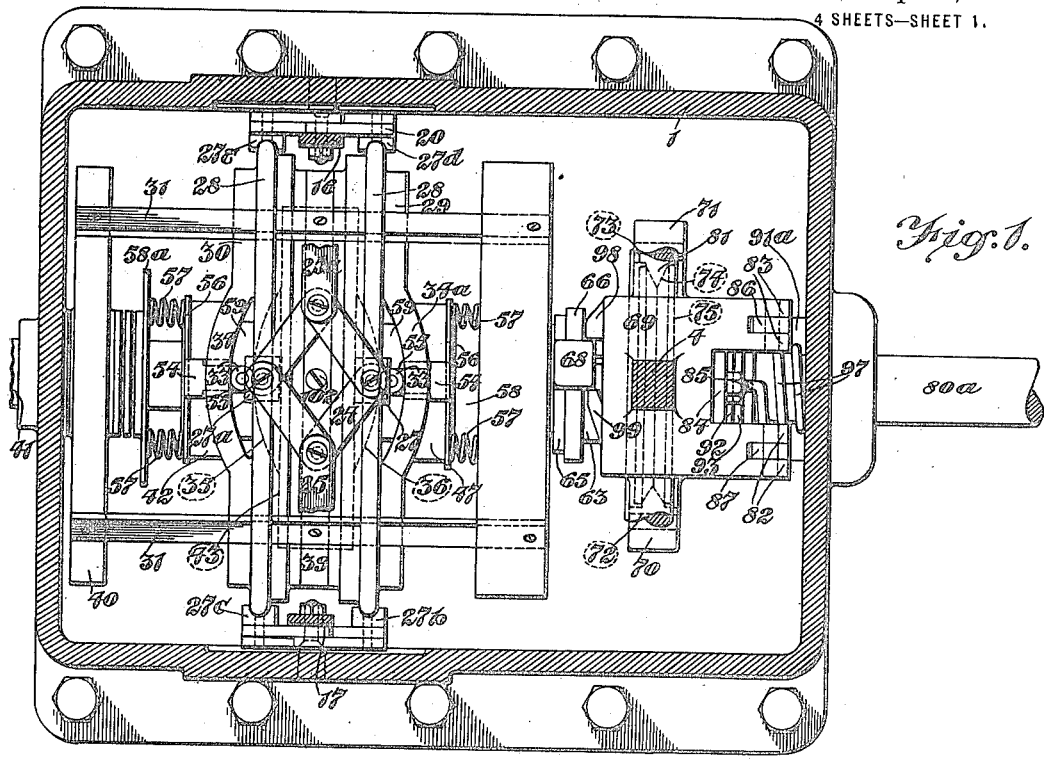

J. W. NOWAK.
TRANSMISSION GEARING AND CLUTCH MECHANISM.
APPLICATION FILED JUNE 2, 1916.

1,277,465.

Patented Sept. 3, 1918.
4 SHEETS—SHEET 1.

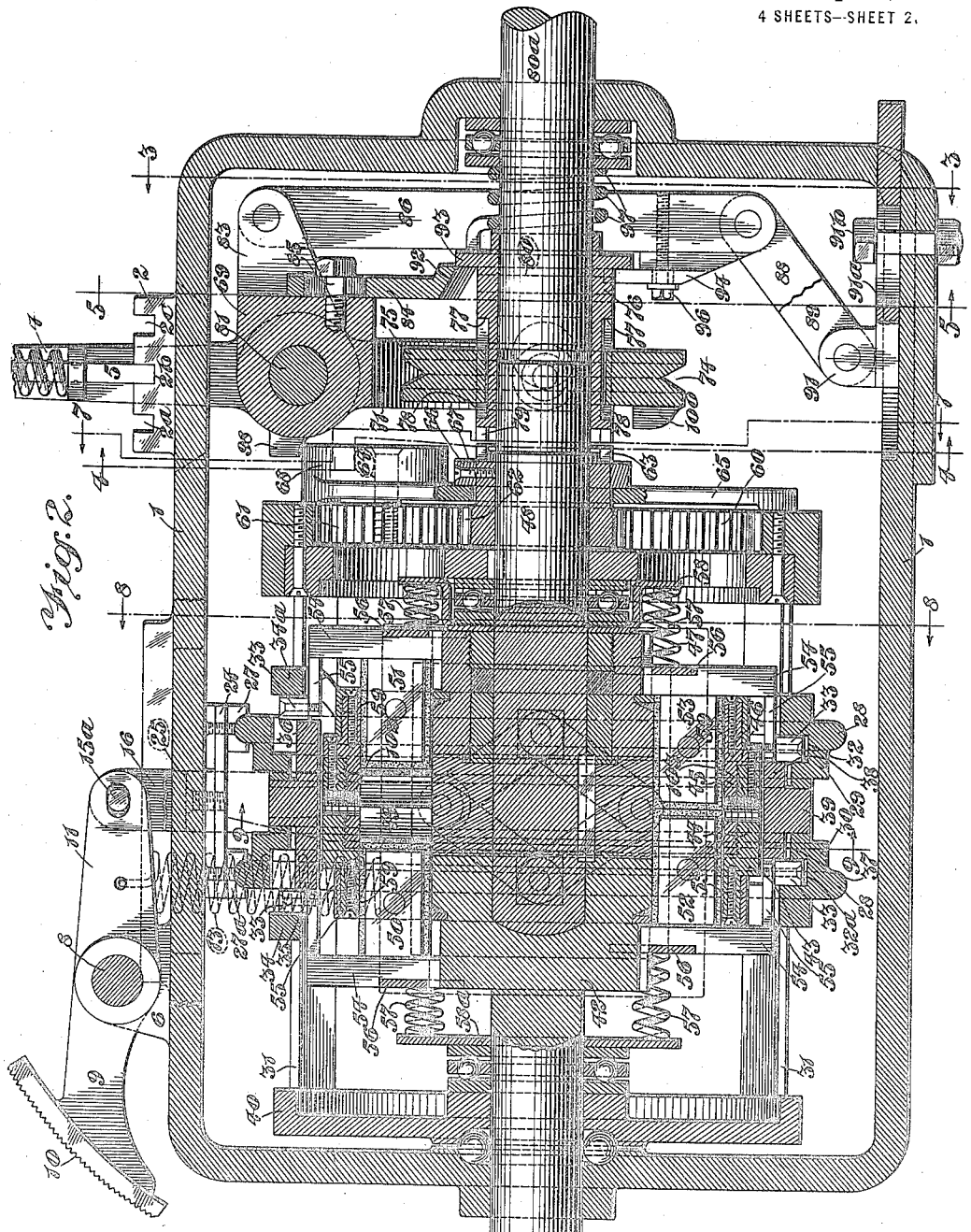

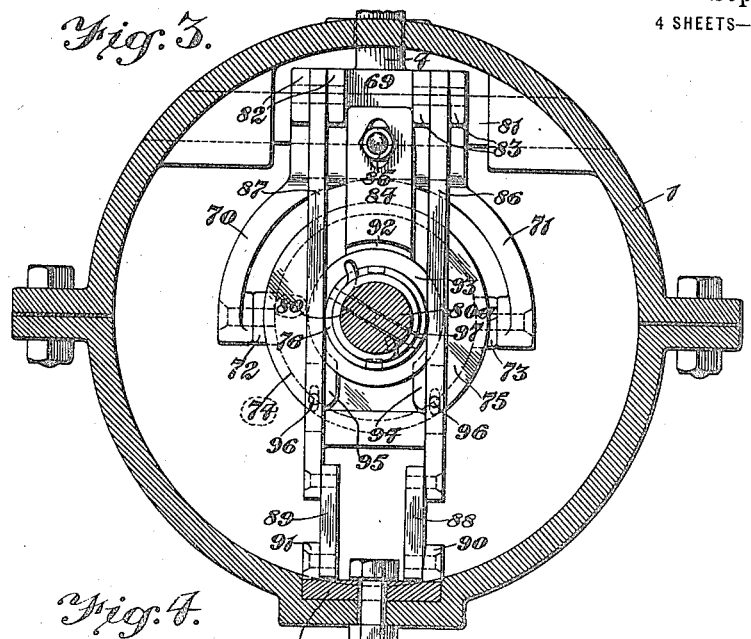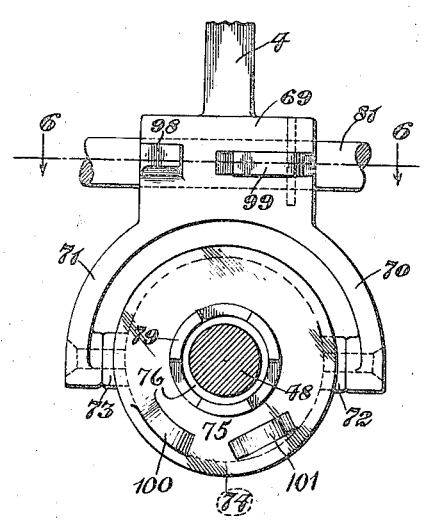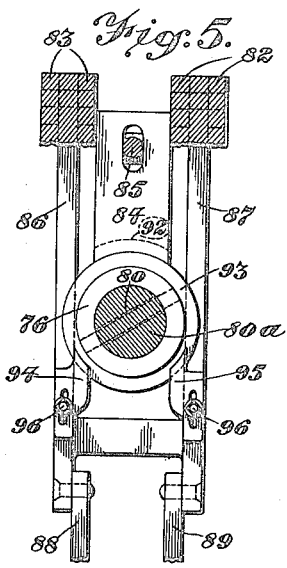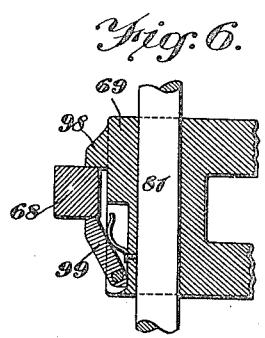

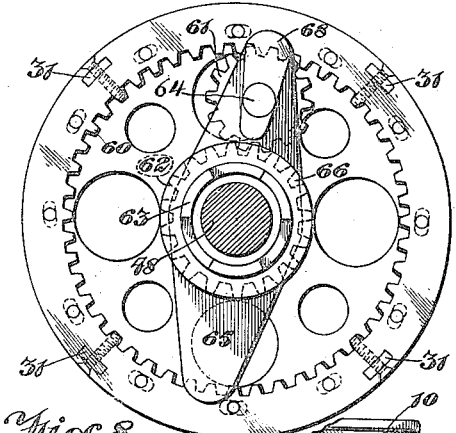

UNITED STATES PATENT OFFICE.

JOHN W. NOWAK, OF ST. LOUIS, MISSOURI.

TRANSMISSION GEARING AND CLUTCH MECHANISM.

1,277,465.

Specification of Letters Patent.

Patented Sept. 3, 1918.

Application filed June 2, 1916. Serial No. 101,296.

*To all whom it may concern:*

Be it known that I, JOHN W. NOWAK, a citizen of the United States, residing at St. Louis, in the State of Missouri, have invented a certain new and useful Transmission Gearing and Clutch Mechanism, of which the following is a specification.

This invention relates primarily to the mechanism aforesaid as applied to motor vehicles, although it may be readily adapted for use in connection with stationary engines, and the chief objects of the invention are to combine said gearing and mechanism and to provide means for eliminating the shock incident to shifting from low to high speed in getting the vehicle under way. Other objects and advantages will become apparent upon consideration of the following portions of the specification and the claims appended.

Referring to the annexed sheets of drawing, wherein like numerals refer to like parts throughout the several views, Figure 1 is a top plan view of the complete apparatus within its housing; Fig. 2 a vertical sectional view; Fig. 3 an end section along line 3—3 of Fig. 2; Fig. 4 a detail view of a portion of the clutch shifting mechanism along line 4—4 of Fig. 2; Fig. 5 a further detail view of said mechanism along line 5—5 of Fig. 2; Fig. 6 a cross-section along line 6—6 of Fig. 4; Fig. 7 a sectional view along line 7—7 of Fig. 2; Fig. 8 a sectional view along line 8—8 of Fig. 2; Fig. 9 a sectional view along line 9—9 of Fig. 2; Fig. 10 an isometric view of certain sliding valves which are employed to vary the speed; Fig. 11 a detail view along line 11—11 of Fig. 10; Fig. 12 a top-plan view of certain of the parts shown in Fig. 9; and Fig. 13 a vertical section along line 13—13 of Fig. 12.

In the practice of my invention a housing 1 is provided for the apparatus and upon the top thereof a rack 2 is fixed whose notches $2^a$, $2^b$ and $2^c$ represent, respectively, the reverse, neutral and forward positions of the shift lever 4 and receive the spring pressed pawl 5 carried by said lever. Adjacent the opposite end of the top of said housing are brackets 6 and 7 through which a shaft 8 is projected, the latter carrying and serving as the fulcrum for lever 9 which is depressed by pressure of the foot of the operator upon plate 10, and in the several views it is assumed that the foot is upon said plate.

The opposite ends of shaft 8 carry links 11—12 which are subjected to the downward pull of springs 13—14 and pivotally connected as at 15—$15^a$ to links 16—17, the latter being formed with slotted cams 18—19 and serving to operate the toggles 20—21 whose arms are pivotally fixed to the housing at points 22—23 and are best shown in Figs. 2 and 8. The intermediate horizontally disposed toggle 24 is operated through the agency of links 25—$25^a$ which carry rollers $25^b$ riding within the cam-slots 18—19.

Pivot bolts 26 connecting certain of the links of said toggles are projected through shoes 27, $27^a$, $27^b$, $27^c$, $27^d$ and $27^e$ which are arranged in pairs and engage the raised edge 28 of each of the annular spiders 29—30 and serve to reciprocate the latter upon guide-rods 31 in response to the movement of said toggles through the agency of the devices above described.

The under surface of spider 29 is grooved for the provision of a track 32 and a similar track $32^a$ is formed in the under surface of spider 30, said tracks being adapted to retain rollers 33 and curving outwardly at one point as at 34—$34^a$ (Fig. 1) in order to permit the opposing rollers to be forced apart, for an interval, by cams 35—36. The latter are formed as enlargements of the flanges 37—38 of an annular ring 39 which is supported by guide-rods 31 and disposed between spiders 29—30 and it will be observed that said cams have the same conformation as the track extensions 34—$34^a$ and are located, when the parts are assembled, in register therewith for the purpose before described.

Guide-rods 31 are affixed to a rim 40 whose hub is mounted upon the propeller or driven shaft 41, the latter being provided with a collar 42 cast integral with an enlarged disk 43 having an interiorly threaded flange 44 which engages the threaded flange 45 of a companion disk 46 arising from collar 47.

Projected through collar 47 and into a recess formed in collar 42 is a stub-shaft 48 upon which is keyed the fan-shaped member 49 best shown in Figs. 12 and 13, and it will be appreciated that the engagement of flanges 44 and 45 results in the provision of a chamber within which said member revolves in unison with said shaft when the same is driven. Disks 43 and 46 are slotted for the passage therethrough of slide-valves 50, 51, 52 and 53, two thereof being seated in each of said disks in the position shown in Fig. 8 so that their ends abut and thus substantially divide the interior of said chamber into two compartments of equal dimensions. By reference to Fig. 10 it will be observed that each of said valves is detachably fastened to plates 54 which are provided with arms 55 carrying the beforementioned rollers 33, and it will further be noted that said valves in disk 43 are retained in contact with those in disk 46 through the agency of plates 56 and compression springs 57 which bear against annular members 58—58ª. Leakage of the fluid which, as hereinafter mentioned, is placed in the chamber aforesaid is prevented by stuffing-boxes 59 (Fig. 8) beneath which the packing is compressed as shown in Fig. 2.

Coming now to the driving mechanism, it will be observed that an internal spur-gear 60 is keyed upon shaft 48 and that the same is driven, when it is desired to operate the vehicle, through the agency of intermediate pinion 61 meshing with pinion 62 which is loosely mounted on said shaft and provided (at the end of its hub) with clutch-teeth 63. Pinion 61 is loosely mounted upon a pin 64 affixed to a swinging arm 65 which rides freely upon the hub of pinion 62 and is retained in place by a separable collar 66 fastened with set-screw 67. A boss 68 is formed at one extremity of arm 65 and the function thereof shall be later described.

Shift-lever 4 is cast integral with or otherwise joined to a block 69 from which depend arms 70—71 forming a yoke, the latter carrying shoes 72—73 adapted to fit the V-shaped groove 74 of sheave 75 which is mounted upon sleeve 76 and permitted to move reciprocably thereon between shoulders 77—78. The outer surface of shoulder 78 is provided with clutch-teeth 79 and a pin 80 is projected through an oblong slot (dotted in Figs. 3 and 5) in the drive shaft 80ª and fastened to sleeve 76, said pin serving to prevent the independent rotation of said sleeve, while the slot permits of its reciprocable movement on said shaft in order to engage or disengage clutch-teeth 63 and 79.

A shaft 81 is projected through block 69 which is provided with arms 82—83 and carries a plate 84 whose upper end is slotted for the reception of a set-screw 85, said arms being pivoted to links 86—87 which are likewise connected to links 88—89, the latter being pivoted to brackets 90—91 fastened to an adjustable slotted plate seated in the floor of the housing and fastened by bolt 91ᵇ. The angular foot 92 of plate 84 is adjusted to operate against the annular flange 93 of sleeve 76 so as to draw the latter forward and thus disengage the clutch when lever 4 is shifted from "forward" to "neutral" position on rack 2, and upon the transfer of said lever from "neutral" position to "reverse" on said rack the resultant upward movement of links 86—87 serves to bring the same forcibly against flange 93 and to lift foot 92 out of contact therewith. Finally, upon shifting lever 4 from "reverse" to "neutral" position, sleeve 76 is brought forward into the position shown through the agency of fingers 94 and 95 which are adjustably fixed to links 86—87 by screws 96 and move forward (i. e. toward the motor) against flange 93 in response to the downward and outward movement of said links occasioned by said shifting of the lever. Should there be any derangement of the clutch-shifting mechanism coil spring 97, whose terminals are connected to shaft 80ª and flange 93, will pull said sleeve forward and thus disengage the clutch-teeth.

By reference to Figs. 1 and 4 it will be noted that block 69 is also provided with a lug 98 and a spring-pressed latch 99, and that sheave 75 carries a similar lug 100 and latch 101, these devices being so disposed as to engage and retain boss 68 of the swinging-arm 65 in order to effect forward or rearward movement of the vehicle as hereinafter described.

The operation of the mechanism is as follows. The several parts being assembled in the relation shown in Fig. 1, one of the screw-plugs 102—103 is removed and the interior of the chamber (before mentioned) is filled with heavy oil or like substance, said plug being then replaced. Upon shifting lever 4 into "forward" position on rack 2, sheave 75 is brought against shoulder 78 by the yoke arms 70—71 and moves sleeve 76 rearwardly so as to bring clutch-teeth 63 and 79 into mesh. The engagement of said teeth serves to drive pinion 62 which rotates pinion 61 and spur-gear 60 until the boss 68 of arm 65 rides over latch 101 and is locked against lug 100 of sheave 75. The sheave being thus engaged with arm 65 and pinion 61 being in close mesh with pinion 62 and spur-gear 60, it follows that said arm revolves in unison with said gear so that the intermediate pinion is not independently rotated during forward movement of the vehicle, but serves only to lock together the drive-pinion and spur-gear, whereby the latter is rotated in the same direction as the former. Upon shifting lever 4 from "neutral" position to "reverse" on rack 2, sheave 75 is drawn toward shoulder 77 and rearward movement of sleeve 76 is effected as before described, by pressure of links 86—87 against flange 93. The clutch-teeth being thus engaged, arm 65 is rotated until its boss 68 is locked against the stationary lug 98 by latch 99, whereupon pinion 61 is subjected to the positive drive of pinion 62 and thus effects the reversal of spur-gear 60. Preparatory to starting the vehicle, lever 4 is shifted (if forward movement is desired) on rack 2 from notch $2^b$ to $2^c$ which results in the engagement of shafts $80^a$ and 48, whereby the latter, its pinion and gear, and spiders 29—30 are rotated, it being appreciated that rotation of said spiders serves to permit rollers 33 to be forced apart, for an interval, by cams 35—36 as before mentioned. Shaft 48 having now gained momentum, the operator gradually depresses lever 9 and thus draws said spiders toward ring 39 through the agency of toggles 20, 21 and 24, with a resulting inward movement of the slide-valves due to the travel of rollers 33 in tracks 32—$32^a$. To the extent that said valves are thus projected within the chamber it will be appreciated that resistance is offered to the propulsion of the fluid therein and compression thereof by member 49 effected, and as the valves are seated within disks 43 and 46 it follows that the pressure thus imposed thereon will result in the rotation of said chamber and shaft 41 which is formed as an extension thereof. While the vehicle is being propelled at an intermediate speed and the valves in question not entirely closed, the latter will automatically withdraw for the passage of member 49 due to the momentary travel of rollers 33 in the outwardly curved portions 34—$34^a$ of tracks 32—$32^a$ said portions (as before described) being assembled in register with the cams 35—36 of ring 39 which serve to force said rollers outwardly at the proper time.

Reverting to Figs. 10, 11 and 12, it will be observed that the slide-valves are formed in two sections and that the inner surface thereof is beveled so as to firmly retain the packing 104, and it will further be noted that the head of fan-shaped member 49 is provided with packing 105 having lateral extensions 106 so as to prevent any leakage past said member of the oil or other fluid confined between disks 43 and 46 and against which it is driven, as mentioned above, to effect rotation of the driven-shaft.

Having thus fully described my invention, what I claim as new and desire to secure by Letters-Patent is:—

1. An apparatus of the character described comprising a fluid-filled chamber, a revoluble shaft extending therethrough, a member affixed to said shaft within said chamber, spiders disposed opposite the ends of said chamber, slide-valves projecting within said chamber, devices connecting said valves and spiders, and means for expanding or contracting said spiders relatively to said chamber to control the disposition of said valves therein.

2. An apparatus of the character described comprising a fluid-filled chamber, a revoluble shaft extending therethrough, a member affixed to said shaft within said chamber, slide-valves projecting within said chamber, means for controlling the position of said valves relatively to said member, and means for automatically effecting a withdrawl of said valves coincident with the passage of said member.

3. An apparatus of the character described comprising a fluid-filled chamber, a revoluble shaft extending therethrough, a member affixed to said shaft within said chamber, slide-valves projecting within said chamber, means for reciprocably moving said valves to vary the degree of compression of said fluid by said member, and means for automatically effecting a withdrawal of said valves coincident with the passage of said member.

4. An apparatus of the character described comprising a fluid-filled chamber, a revoluble shaft extending therethrough, a member affixed to said shaft within said chamber, spiders disposed opposite the ends of said chamber, slide-valves projecting within said chamber, devices connecting said valves and spiders, means for expanding or contracting said spiders relatively to said chamber to control the disposition of said valves therein, and means for automatically effecting a withdrawal of said valves coincident with the passage of said member.

JOHN W. NOWAK.

Witnesses:
W. KEANE SMALL,
ELLEN M. TEBBETTS.